United States Patent
Wakamatsu et al.

[11] Patent Number: 5,813,917
[45] Date of Patent: Sep. 29, 1998

[54] SHAFT ASSEMBLY

[76] Inventors: Minoru Wakamatsu, 12-7, Kawahara-cho, Okazaki-shi, Aichi-ken 444-21; Takashi Matsuda, 2-55-7, Tanaka-cho, Toyota-shi, Aichi-ken 471; Kohki Kawarada, 7-4-9, Itsutsugaoka, Toyota-shi, Aichi-ken 471; Hiroshi Hori, 5-102, Shimoichiba-cho, Toyota-shi, Aichi-ken 471, all of Japan

[21] Appl. No.: 760,413

[22] Filed: Dec. 4, 1996

[30] Foreign Application Priority Data

May 12, 1995 [JP] Japan ................................ 7-344530

[51] Int. Cl.⁶ ............................................. F16D 3/22
[52] U.S. Cl. ........................ 464/140; 464/144; 464/906
[58] Field of Search ................................. 464/139, 140, 464/141, 142, 143, 144, 145

[56] References Cited

U.S. PATENT DOCUMENTS

| | | | |
|---|---|---|---|
| 4,232,756 | 11/1980 | Bathelt | 46/140 X |
| 4,300,651 | 11/1981 | Krude | 464/140 X |
| 4,878,882 | 11/1989 | Welschof et al. | 464/144 |
| 4,892,433 | 1/1990 | Schreiber | 464/140 X |
| 5,026,325 | 6/1991 | Welschof | 464/144 X |
| 5,052,979 | 10/1991 | Welschof et al. | 464/140 |
| 5,186,687 | 2/1993 | Hayashi et al. | 464/144 |
| 5,531,643 | 7/1996 | Welschof | 464/144 |

FOREIGN PATENT DOCUMENTS

| | | |
|---|---|---|
| 53-123744 | 10/1978 | Japan . |
| 3-223524 | 10/1991 | Japan . |
| 6-33221 | 8/1994 | Japan . |

*Primary Examiner*—Eileen A. Dunn

[57] ABSTRACT

A shaft assembly in which a cross-groove universal joint is mounted on each of the two end portions of a shaft. In this cross-groove universal joint, an inner race formed in the outer circumference with ball grooves inclined alternately in opposite directions with respect to the axial direction and an outer race formed in the inner circumference with ball grooves oriented to intersect the former ball grooves are concentrically fitted. Balls are arranged at the intersections between the ball grooves of the inner race and the ball grooves of the outer race, as confronting each other. The balls are retained by a cage arranged between the inner race and the outer race. A first inner race is fixed on one end portion of shaft, and a second inner race is fixed on the other end portion of the shaft such that with respect to any of the ball grooves of the first inner race, the ball grooves, as inclined in the directions opposed to those of the former ball grooves with respect to the axial direction, are positioned within an offset range of a predetermined phase from the complete in-phase position in the circumferential direction of the shaft.

3 Claims, 6 Drawing Sheets

MOVING DIRECTION OF BALLS

SHAFT ASSEMBLY

BACKGROUND OF THE INVENTION

1. Field of the Invention

The present invention relates to a shaft assembly for a drive shaft or the like having constant-velocity universal joints at its two ends.

2. Related Art

The drive shaft of a vehicle is constructed, for example, by jointing a plurality of shafts having intersecting center axes of rotation in a power transmitting manner by one or more constant-velocity joints. As the angles to be made by the center axes of those shafts, namely, the joint angles become the larger, it is necessary to use more excellent constant-velocity universal joints.

A cross-groove universal joint is known as one of the excellent constant-velocity joints. This cross-groove universal joint is composed of six balls (or steel balls), a cage and inner and outer races for retaining the balls.

Figure 10:
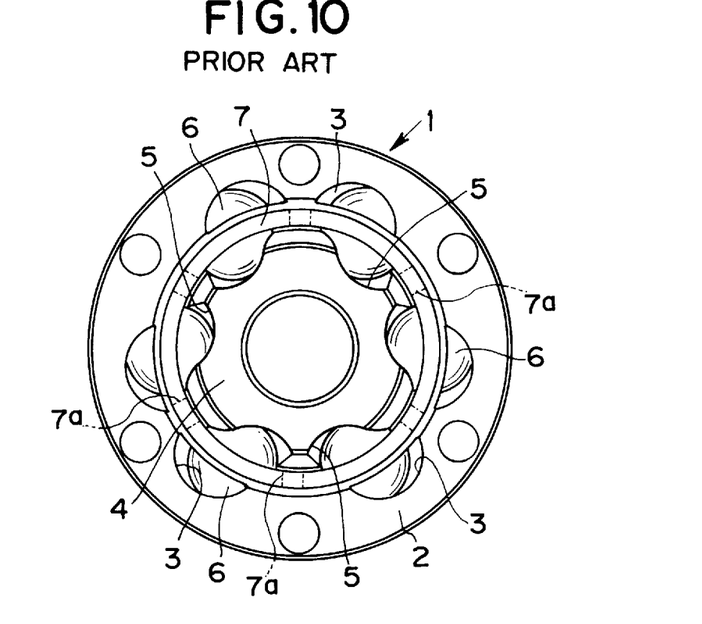
FIG. 10 is a front elevation showing an ordinary cross-groove universal joint of the prior art.

FIG. 10 shows a cross-groove universal joint 1, as disclosed in JPU-6-33221. Six ball grooves 3, as formed in the inner circumference of an outer race 2, and six ball grooves 5, as formed in the outer circumference of an inner race 4, are arranged to intersect each other, and balls 6 are individually fitted in the six intersections of the two ball grooves 3 and 5 and can be retained in a rolling manner by a cage 7. The ball grooves 3 and 5, as formed in the outer race 2 and the inner race 4, are helically inclined in opposite direction at equal angles with respect to a straight line along the axial reference direction. The torque is transmitted through those ball grooves 3 and 5 and the balls 6 between the outer race 2 and the inner race 4, and an extendibility is given by the inclined ball grooves 3 and 5.

A third compelling force, as established when the cross-groove universal joint 1 thus constructed is rotated with the two shafts being at an angle, is lower than those of other constant-velocity joints. Specifically, the balls are clamped by the ball grooves, and the center axes of the two shafts are folded to intersect each other, so that the intersecting states of the individual ball grooves are continuously changed to push the balls in the axial direction. These axial forces are established at the individual balls, but the intersecting states of the individual ball grooves are different in the phases of the circumferential direction so that the axial pushing forces to act on the individual balls are different from each other in their magnitudes or directions. The total of these axial pushing forces of the individual balls acts on the inner race or the outer race so that it appears as the third compelling force.

This third compelling force of the cross-groove universal joint is lower than those of other universal joints. Thus, the cross-groove universal joint has less vibrations due to this compelling force so that it is frequently used as the constant-velocity joint for the drive shaft of a high-grade car.

Figure 11:
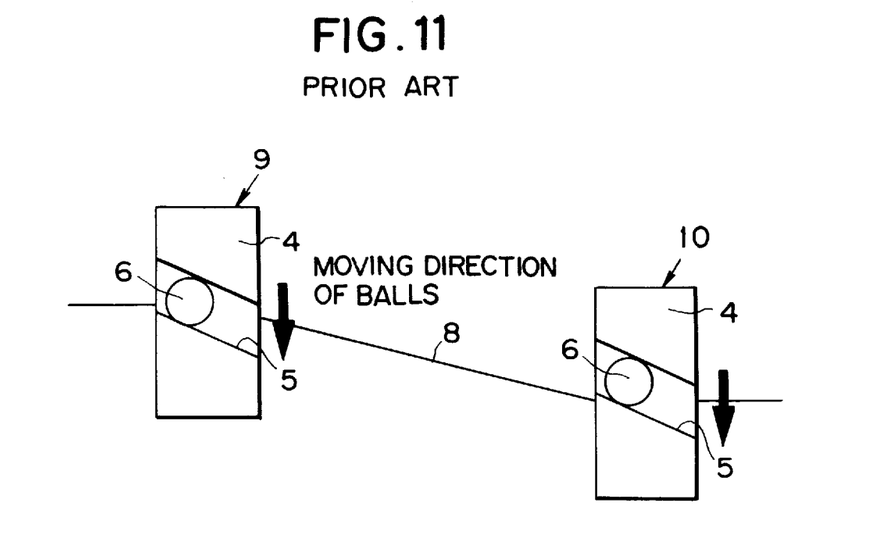
FIG. 11 is an explanatory diagram showing the jointed state of the shaft assembly of the prior schematically.

On the other hand, some drive shafts, as jointed through two or more constant-velocity joints, are equipped with those cross-groove universal joints at the two ends of an intermediate shaft. As shown in FIGS. 10 and 11, for example, an intermediate shaft 8 is equipped a first joint 9 at the end portion of its input side (or at the lefthand side of FIG. 11) and a second joint 10 at the end portion of the output side (or at the righthand side of FIG. 11), the individual inner races 4 of which are mounted on the end portions of the intermediate shaft 8.

In the outer circumference of the inner race 4 of each joint 9 or 10, moreover, there are formed the six (although only one is shown in FIG. 11) ball grooves 5 which are extended obliquely with respect to the axis and alternately reversed. Around each inner race 4, still moreover, there is concentrically arranged the outer race 2 which is formed in its inner circumference with the six ball grooves 3 extending in the direction to intersect the individual ball grooves 5 of the inner race 4. Between the inner race 4 and the outer race 2, on the other hand, there is interposed the annular cage 7 which is provided with six apertures 7a. At the intersections between the individual ball grooves 3 of the outer race 2 and the individual ball grooves 5 of the inner race 4, as formed to confront each other in the directions to intersect each other, there are individually arranged the balls 6 which are retained by the individual apertures 7a of the cage 7. Thus, the torque of the drive side shaft is transmitted from the outer race 2 (as omitted from FIG. 11) of the first joint 9 through the inner race 4 to the intermediate shaft 8, the torque of which is transmitted from the inner race 4 of the second joint 10 through the outer race 2 (as also omitted from FIG. 11) to the driven side shaft.

In the aforementioned intermediate shaft assembly of the prior art having the cross-groove universal joints 9 and 10 at the two ends, however, the joints 9 and 10 are mounted at individually arbitrary angles on the intermediate shaft 8, but no consideration is taken regarding the mutual mounting phases of the joints 9 and 10.

This will be reasoned in the following. Since the third compelling force to be established when the shaft jointed by the cross-groove universal joints 9 and 10 rotates while being given the joint angle is lower than that of other constant-velocity joints and since the components other than the drive shaft are not required to have a high mounting accuracy, the vibrations to be caused in the components are higher even if the compelling forces to be generated in the cross-groove universal joints 9 and 10 are more or less increased to vibrate. Thus, no consideration is taken in the least regarding the reduction in the third compelling forces in the joints 9 and 10 constructing the intermediate shaft assembly.

The third compelling force in the cross-groove universal joint is established as a result that the axial component of the load to be applied from the inner race 4 and the outer race 2 to the balls 6 on transmitting torque acts as the load of pushing the apertures 7a of the cage 7, so that it is established when the joint angle is given between the intermediate shaft 8 and the input or output side shaft jointed to the former. In other words, while the intermediate shaft 8 is performing one rotation, the balls 6 make one circumferential reciprocation in the apertures 7a so that the axial load for establishing the frictional force during this one reciprocation acts as that compelling force.

On the other hand, the direction of the aforementioned compelling force to be established at the two ends of the intermediate shaft 8 is continuously changed into forward and backward directions by the rotations of the joints 9 and 10. As a result, for example, as shown in FIG. 11, the first joint 9 and the second joint 10 at the two ends of the intermediate shaft 8 may be individually mounted to establish the third compelling force in the same direction, if the directions of inclination of the ball grooves 5 formed in the individual inner races 4 are substantially in phase. In this case, the compelling forces may be added to result in a substantially double compelling force, if the conditions allow. Moreover, the third compelling force is established by the rotations of the joints 9 and 10, and its direction continuously changes forward and backward to cause the vibrations.

In recent years, the desire, in cars of a higher grade, has advanced so that a comfortable drivability is thoroughly sought after. According to our investigations, it has been found that the vibrations of the drive shaft are transmitted through a mount of a differential gear case or through a suspension to a car body to deteriorate the drivability. Since these vibrations of the drive shaft include those coming from the third compelling forces established by the joints 9 and 10 at the two ends of the drive shaft, it has been desired to reduce the vibrations of the drive shaft thereby to improve the comfortable drivability by reducing those third compelling forces.

SUMMARY OF THE INVENTION

A major object of the present invention is to provide a shaft assembly using at least one pair of cross-groove universal joints, in which the third compelling force, i.e., the alternate thrust force, is reduced.

Another object of the present invention is to reduce the vibrations which are caused in the shaft assembly as the torque is transmitted.

The present invention is characterized by the structure of mounting the individual inner races in the shaft assembly having the cross-groove universal joints mounted on the two end portions of the shaft. In short, there are specified the phases of the individual races to be mounted on the shaft. Specifically, the mounting phases of the two inner races are so set that, with respect to the ball grooves of one inner race, the ball grooves of the other inner race, as inclined in the direction opposed to that of the former ball grooves, are positioned within a predetermined phase difference range.

This phase difference range can be set to ±30 degrees or ±15 degrees.

As a result, the third compelling force, as established in the axial direction in one cross-groove universal joint, and the third compelling force, as established in the axial direction in the other cross-groove universal joint, are opposed to each other so that the compelling forces to be alternately established in the thrust direction in the shaft assembly are offset and reduced.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENT

With reference to FIGS. 1 to 9, here will be described one embodiment in which the present invention is applied to the intermediate shaft of a vehicular drive shaft, as jointed by two or more cross-groove universal joint.

Figure 1:
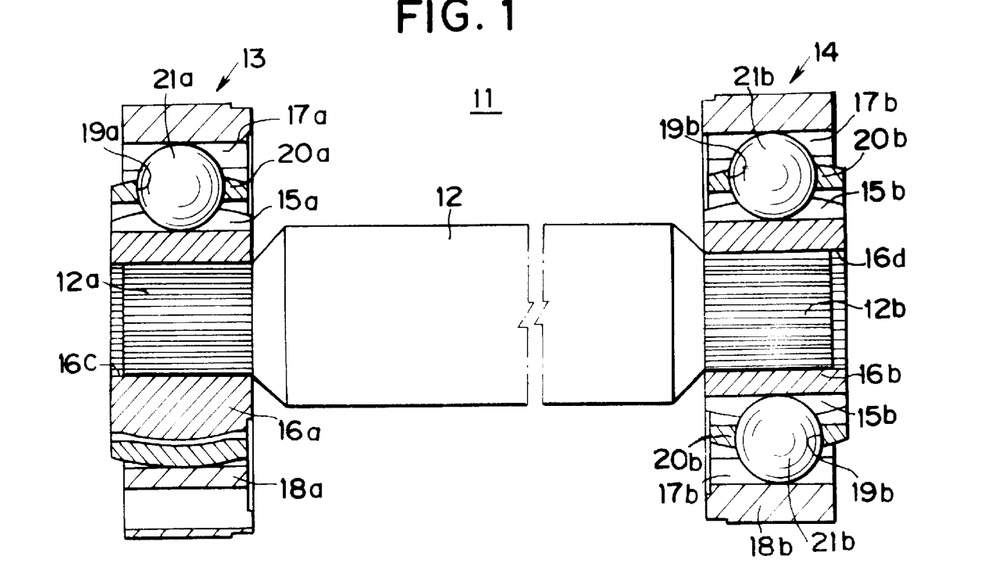
FIG. 1 is a side elevation showing one embodiment of a shaft assembly of the present invention.
Figure 2:
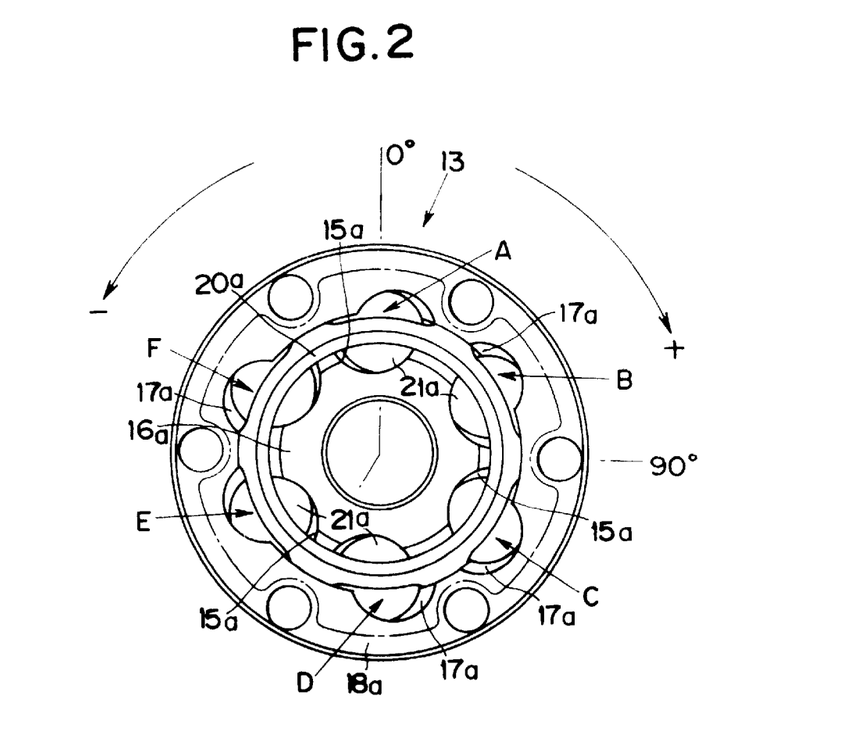
FIG. 2 is a front elevation of a first cross-groove universal joint of the present invention.

A shaft assembly 11 is constructed, as shown in FIG. 1, to include: an intermediate shaft 12; a first cross-groove universal joint (as will be shortly referred to as the "first joint") 13 mounted on one end of the intermediate shaft 12; and a second cross-groove universal joint (as will be shortly referred to as the "second joint") 14 mounted on the other end. Moreover, the first joint 13 includes: a cylindrical inner race 16a having six ball grooves 15a, as designated by A, B, . . . and F, in its outer circumference; and an outer race 18a having six ball grooves 17a in its inner circumference and fitted at a spacing around the inner race 16a. The individual ball grooves 15a of the inner race 16a and the individual ball grooves 17a of the outer race 18a are individually arranged to confront in a crossing state.

Specifically, the six ball grooves 15a, as formed in the inner race 16a, and the six ball grooves 17a, as formed in the outer race 18a, are so helically arranged that their inclinations are alternately reversed with reference to the axial direction. Moreover, the inner race 16a and the outer race 18a are so concentrically assembled that the ball grooves 15a and 17a, as inclined in the opposite directions with respect to the axial direction, confront each other.

Between the outer race 18a and the inner race 16a, moreover, there is interposed an annular cage 20a which is provided with six apertures 19a. In the cross grooves, as defined by the ball grooves 15a of the inner race 16a and the ball grooves 17a of the outer race 18a, namely, at the intersections between the individual ball grooves 15a and 17a, there are individually fitted in rolling a manner steel balls 21a. Moreover, these balls 21a are retained by the apertures 19a of the cage 20a.

Like the first joint 13, the second joint 14 includes: a cylindrical inner race 16b having six ball grooves 15b, as designated by A, B, . . . and F in the other circumference; an outer race 18b having six ball grooves 17b in the inner circumference and fitted at a spacing around the inner race 16b; an annular cage 20b interposed between the outer race 18b and the inner race 16b and having six apertures 19b; and six balls 21b fitted in rolling a manner at the intersections between the individual ball grooves 15b of the inner race 16b and the individual ball grooves 16b of the outer race 18b, as arranged to confront each other, and retained by the apertures 19b of the cage 20b.

In short, in the second joint 14, too, the ball grooves 15b of the inner race 16b are so helically arranged that their inclinations with respect to the axial direction are alternately opposed to each other. Moreover, the inner race 16b and the outer race 18b are so concentrically assembled that the ball grooves 15b and 17b, as inclined in opposite direction with respect to the axial direction, confront each other. Still moreover, the balls 21b are arranged at the intersections between those ball grooves 15b and 17b and are loosely fitted in the apertures 19b of the cage 20b.

At the two ends of the intermediate shaft 12, there are individually formed external splined portions 12a and 12b. The splines of these external splined portions 12a and 12b are in phase with each other.

In the first joint 13, moreover, the external splined portion 12a, as located at the input end portion (at the lefthand side of FIG. 1) of the intermediate shaft 12 is splined on an internal splined portion 16c in the inner circumference of the inner race 16a. In the second joint 14, on the other hand, an internal splined portion 16d of the inner race 16b is made to engage with the external splined portion 12b at the output end portion (at the righthand side of FIG. 1) of the intermediate shaft 12. In this case, the individual inner races 16a and 16b are so assembled with the intermediate shaft 12 that the individual ball grooves 15b, as formed in the inner race 16b of the second joint 14 at the output side, and the individual ball grooves 15a, as formed in the inner race 16a of the first joint 13 at the input side, make a predetermined phase relation, as defined in the following.

Figure 3:
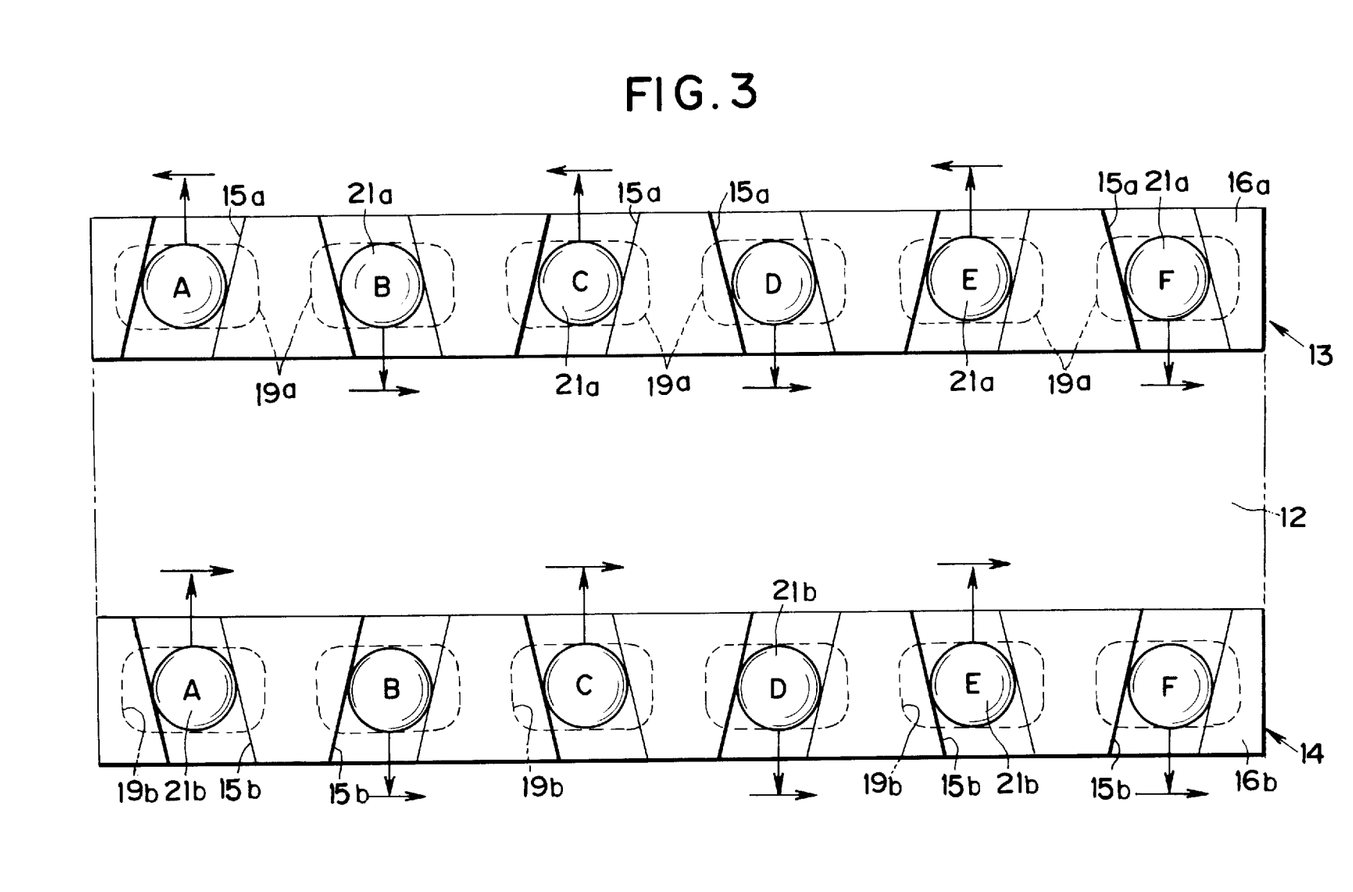
FIG. 3 is an expansion diagram showing the state in which the ball grooves of the inner races of the individual cross-groove universal joint of the present invention are formed in comparison.

In the inner race 16a of the first joint 13 at the input side, more specifically, there are formed the six ball grooves 15a, as designated at A, B, . . . and F, which are arranged at a circumferential pitch of 60 degrees, as shown in FIG. 3. These ball grooves 15a are inclined at a predetermined angle with respect to the axial direction, and the adjoining ones are inclined in opposite directions and arranged symmetrically of the axial direction. In FIG. 3, the three grooves A, C and E are individually inclined in the same direction and given the same shape. Specifically, the adjoining grooves such as the grooves A and B or B and C are inclined in the opposite directions but arranged symmetrically of the axial direction.

Figure 4:
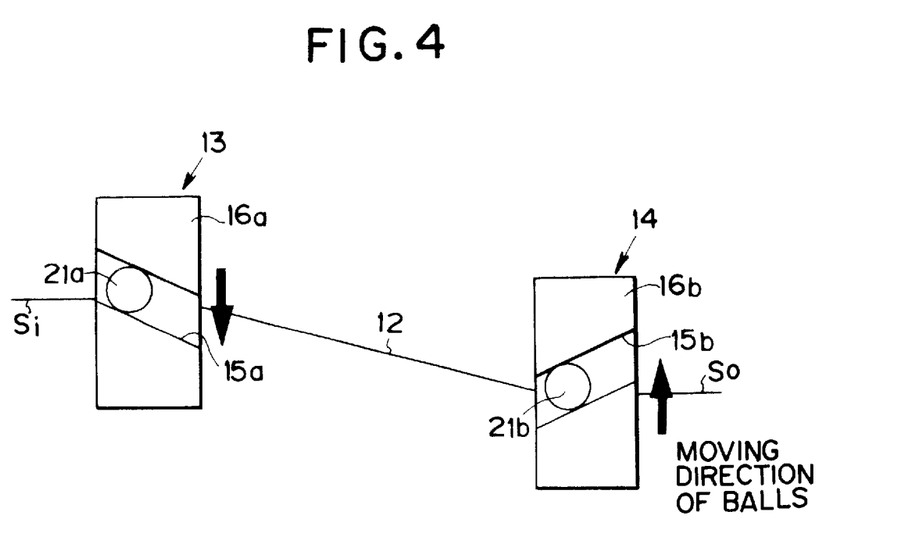
FIG. 4 is an explanatory diagram schematically showing a principle on which a compelling force is reduced in the shaft assembly of the present invention.

In the inner race 16b of the second joint 14 at the output side, too, there are formed the six ball grooves 15b, as designated by A, B, . . . , and F, which are arranged at the circumferential pitch of 60 degrees. Of these ball grooves 15b, the ball groove 15a, as indicated by A, in the inner race 16a at the input side and the ball groove 15b, as indicated by A, at the input side are inclined in the opposite directions with respect to the axial direction. Specifically, the individual inner races 16a and 16b are so assembled with the intermediate shaft 12 that the ball grooves 15a and 15b identical to each other in the circumferential phase direction are inclined in the opposite directions with respect to the axial direction. The assembled state, i.e., the mutual relation of the individual inner races 16a and 16b through the intermediate shaft 12 are schematically shown in FIGS. 3 and 4.

Here will be described the operations of the shaft assembly 11 thus made. The first description is directed to the third compelling force to be established in the first and second joints 13 and 14.

Figure 5:
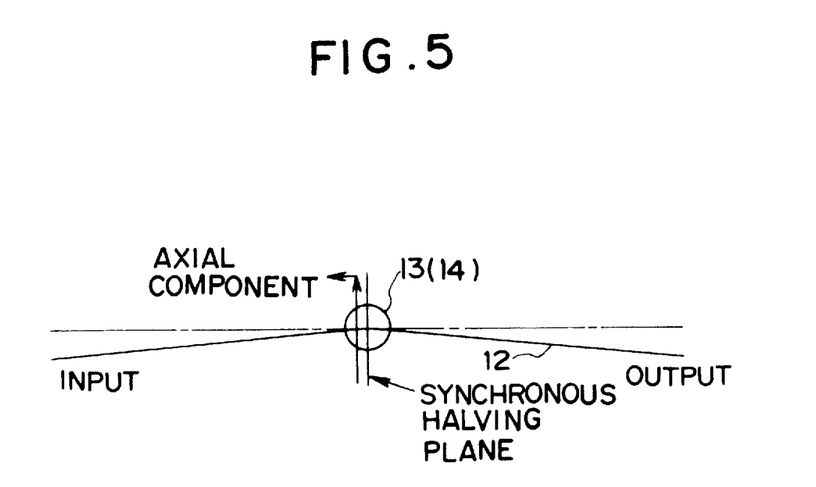
FIG. 5 is an explanatory diagram showing the state in which an joint angle between the two shafts to be jointed by the cross-groove universal joint is given in the present invention.
Figure 6:
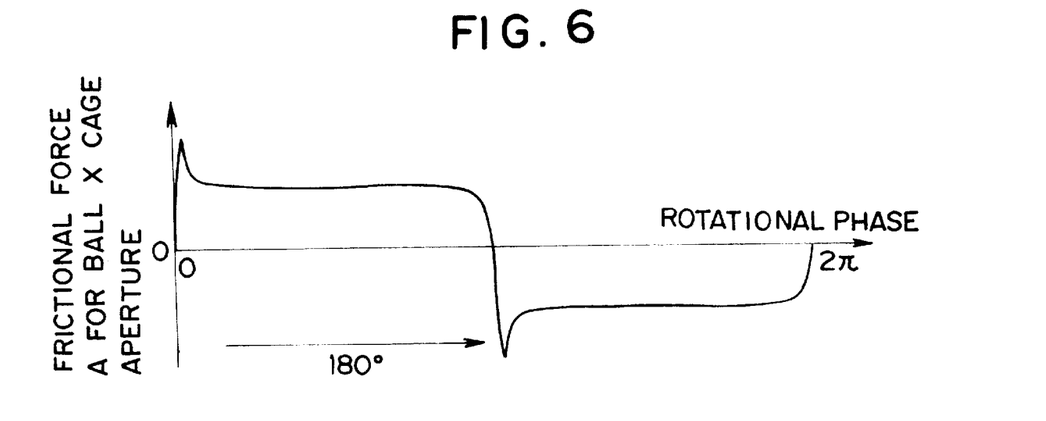
FIG. 6 is an explanatory diagram showing a frictional force to be generated in a ball groove A during one rotation of the inner race in the cross-groove universal joint of the present invention.

Here is assumed that a shaft Si at the input side, as jointed by the first joint 13, and the intermediate shaft 12 be rotated while being given such a joint angle as to protrude upward, as shown in FIG. 5. It is further assumed that polar coordinates be taken, as seen from the side of the output shaft in FIG. 2, and that the clockwise direction be positive. A frictional force is established, as indicated by the arrow in FIG. 6, in the groove A of the six ball grooves 15a in the inner race 16a of the first joint 13 during one rotation of the intermediate shaft 12. Specifically, the outer race 18a is jointed to the shaft Si at the input side so that it rotates integrally with the shaft Si at the input side, whereas the inner race 16a is mounted to the intermediate shaft 12 so that it rotates integrally with the intermediate shaft 12. These input shaft Si and intermediate shaft 12 are given a predetermined joint angle. As a result, the axes of rotation are different between the outer race 18a and the inner race 16a. On the other hand, the balls 21a are always positioned on the plane (or equal speed plane) which extends through the intersection of the center axes of the individual shafts Si and 12 to halve the joint angle. As a result, the balls 21a reciprocate in the axial direction relative to the inner race 16a and the outer race 18a. These reciprocations are caused by the fact that the intersecting states of the individual ball grooves 15a and 15b continuously change during the rotations. As a result, the balls 21a are pushed onto the edges of the apertures 19a of the cage 20a to establish the frictional forces. The ball 21a in the groove A is pushed in one axial direction during a half rotation of the first joint 13 and in the other axial direction during a second half rotation so that the frictional force, as illustrated by the waveform in FIG. 6, is established in the groove A.

Figure 7:
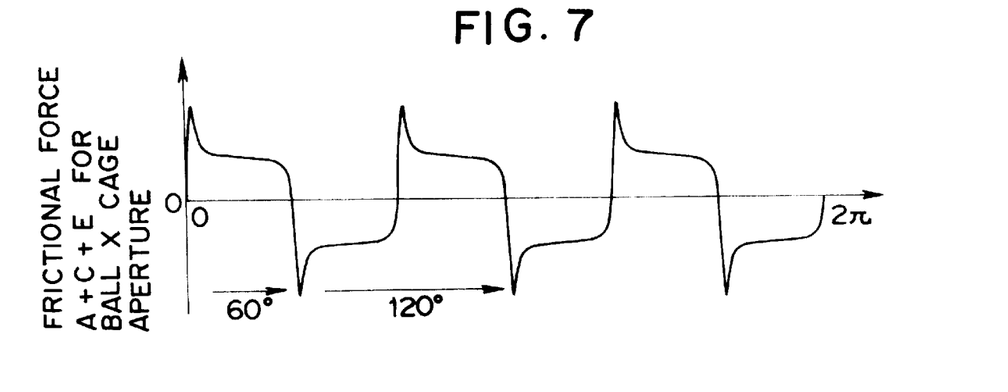
FIG. 7 is an explanatory diagram showing the frictional forces to be generated in ball grooves A, C and E.

The ball grooves 15a, as designated by C and E, are given the same inclination as that of the groove A and are given a pitch of 120 degrees in the circumferential direction so that the sum of the frictional forces established in the individual grooves A, C and E is illustrated in FIG. 7.

In the grooves B, D and F, as inclined in the direction opposed to that of the individual ball grooves 15a, as designated by A, C and E, with respect to the axial direction, there are established the axial forces which have axial components reversed from those of the frictional forces to be established in the aforementioned individual grooves A, C and E, as shown in FIG. 3. The sum of the frictional forces of those grooves B, D and F is illustrated by broken lines in FIG. 8 with reference to the phase of the groove B, for example. Since, however, these grooves B, D and F are shifted in phase by 60 degrees from the aforementioned grooves A, C and E, the sum of the frictional forces of the grooves B, D and F is illustrated by solid lines in FIG. 8. In only the first joint 13, therefore, the directions of the frictional forces to be established in the individual ball grooves 15a, as designated by A, B, . . . and F, are alternately reversed, but the individual ball grooves 15a are formed at the pitch of 60 degrees so that the frictional forces, as established in those ball grooves, do not cancel each other but establish the third compelling force.

Figure 8:
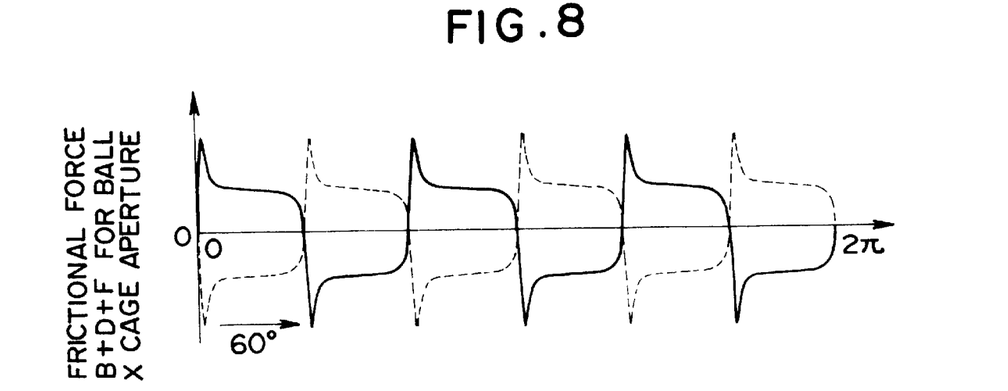
FIG. 8 is an explanatory diagram showing the frictional forces to be generated in ball grooves B, D and F.

Specifically, the axial load (or axial component) for establishing the frictional force which is composed of the frictional force illustrated in FIG. 7 and the frictional force illustrated in FIG. 8 is established as the third compelling force.

The magnitude of the third compelling force, as thus established in the first joint 13, is the axial component of the load to be applied at the torque transmitting time to the balls 21a from the inner race 16a and the outer race 18a so that it acts as a load to push the balls 21a onto the apertures 19a of the cage 20a. This load is equal to the magnitude of the axial component of the frictional force at the instant when the balls 21a cause one reciprocation with respect to the apertures 19a by giving the joint angle so that the inner race 16a makes one rotation.

On the other hand, a third compelling force is likewise established when a shaft So at the output side, as jointed by the second joint 14, and the intermediate shaft 12 are rotated while being given the joint angle.

In only the second joint 14, too, there is established the same third compelling force as that of the first joint 13 so that its description will be omitted.

In the shaft assembly according to the present invention, moreover, the mounting states of the first and second joints 13 and 14 at the two ends of the intermediate shaft 12 have the aforementioned specified relations so that the compelling force as the entire shaft assembly, i.e., the alternate thrust force can be reduced.

Specifically, the directions of inclination of the ball grooves 15a and 15b in phase, as located in the inner race 16a of the first joint 13 and in the inner race 16b of the second joint 14, are opposed to each other, as shown in FIG. 3 or 4. In other words, the individual inner races 16a and 16b are mounted with a relative phase shift of 60 degrees on the intermediate shaft 12. In the first joint 13 and the second joint 14, on the other hand, there is established the frictional force which is composed of the frictional forces illustrated in FIGS. 7 and 8, so that the axial force for establishing the frictional force, i.e., the axial component establishes the third compelling force. However, the frictional forces at the individual joints 13 and 14 are repeated at a period of 120 degrees, as illustrated in FIGS. 7 and 8, and inverted in positive and negative signs at the half period (i.e., 60 degrees). On the other hand, the inner races 16a and 16b of the individual joints 13 and 14 are mounted with the mutual phase shift of 60 degrees on the intermediate shaft 12 so that the directions of the axial loads for establishing the frictional forces in the inner races 16a and 16b, namely, the directions of the third compelling forces are reversed to each other.

While the third compelling force is acting on the first joint 13 in the tensile direction (i.e., leftward of FIG. 4), the third compelling force acts on the intermediate shaft 12 in the second joint 14 in the tensile direction (i.e., rightward of FIG. 4). Like this, while the third compelling force is acting on the first joint 13 in the compressive direction (i.e., rightward of FIG. 4), the third compelling force acts on the intermediate shaft 12 in the second joint 14 in the compressive direction (i.e., the leftward of FIG. 4). As a result, the third compelling forces to be established in the individual joints 13 and 14 can be offset to prevent establishment of a vibromotive force for vibrating the shaft assembly 11 including the intermediate shaft 12 in the thrust direction.

Incidentally, in order that the joints 13 and 14 are so assembled with the two ends of the intermediate shaft 12 so that the ball grooves 15a and 15b of the inner races 16a and 16b may make a predetermined angle to offset the compelling forces completely, it is necessary to eliminate the phase error in the assembly of the inner races 16a and 16b with the intermediate shaft 12.

In order to complete this phase error in this assembly, however, it is further necessary to enhance the accuracy in the positions for forming and in the machining not only the external splined portions 12a and 12b on the two ends of the intermediate shaft 12 but also the individual internal splined portions 16c and the ball grooves 15a and 15b in the inner races 16a and 16b. This makes it practically difficult for a remarkably high cost to match the phases of the individual inner races 16a and 16b completely with the ideal states.

With a more or less phase difference in this assembly, however, the effect of reducing the third compelling force can be achieved by the entire shaft assembly.

Figure 9:
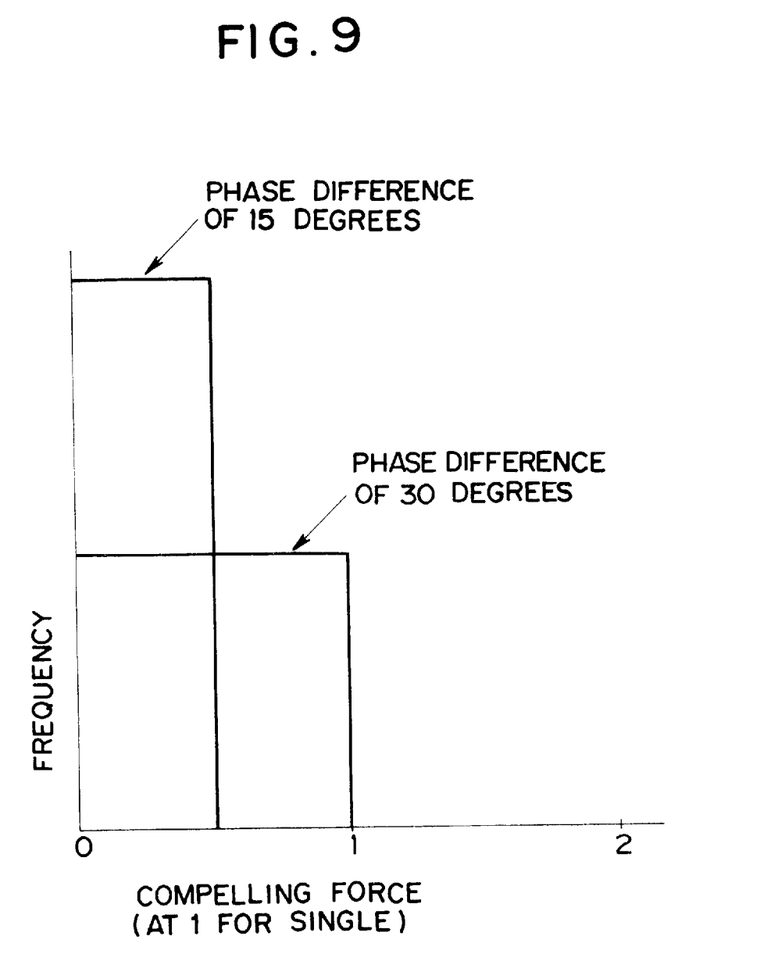
FIG. 9 is a diagram showing a relation between the phase difference in the assembly and the magnitude of the compelling force.

FIG. 9 is a diagram illustrating a relation between the accuracy for assembling the inner races 16a and 16b with the intermediate shaft 12 and the magnitude and frequency of the third compelling force. Here is assumed that the third compelling force to be established in the single cross-groove universal joint be at "1". It is then seen from FIG. 9 that if the paired cross-groove universal joints are assembled with a phase difference of 30 degrees, no product has a compelling force of "1 or more" to be established in the case of using the shaft assembly 11, and that if the phase difference for the assembly is at 15 degrees, nor has the product having a compelling force of "0.5 or more". According to the present invention, therefore, when the cross-groove universal joint is to be mounted on each of the two end portions of the shaft, the ball grooves of one cross-groove universal joint may be within a predetermined phase range with respect to the phases of the ball grooves of the other cross-groove universal joint, but need not completely match the phases in which the third compelling force is completely offset.

In the present invention, moreover, the means for mounting the inner races 16a and 16b on the intermediate shaft 12 may be serrations in place of the splines.

According to the present invention, as has been described hereinbefore, in the shaft assembly having the cross-groove universal joints at its two ends, these cross-groove universal joints are so mounted as to mutually cancel and reduce the compelling forces to be established during the rotations, so that the compelling force in the thrust direction, as established according to the torque transmission, is reduced. As a result, if the shaft assembly is applied to the drive shaft of a vehicle, the vibration of the shaft due to that compelling force can be reduced to provide a comfortable drivability.

What is claimed is:

1. A shaft assembly comprising:

a shaft; and a cross-groove universal joint mounted on each of the two end portions of the shaft, each said cross-groove universal joint having an inner race whose outer circumference includes first inner ball grooves inclined alternately in opposite directions with respect to the axial direction, concentric with the inner race, and an outer race whose inner circumference includes second inner ball grooves oriented to intersect the first inner ball grooves, in which balls are arranged at the intersections between facing ones of the first and second inner ball grooves, and in which said balls are retained by a cage arranged between said inner race and said outer race, wherein an inner race of a first of said universal joints is fixed on one end portion of said shaft and an inner race of a second of said universal joints is fixed on the other end portion of said shaft such that, with respect to a respective ball groove of said inner race of said first of said universal joints, a ball groove of the inner race of said second of said universal joints inclined in the direction opposed to that of the ball groove of the respective inner race of the first of said universal joints is positioned within a predetermined offset phase range from a complete circumferential in-phase position with respect to the respective ball groove of the inner race of the first of said universal joints, wherein said predetermined offset phase range is selected such that a third compelling force acting in an axial direction of said shaft and generated by said first and second universal joints taken together when said first and second universal joints are rotated, is no greater than a third compelling force generated by a single one of said first and second universal joints taken individually.

2. A shaft assembly according to claim 1, wherein said range is within ±15 degrees from the phase of the ball grooves of said first inner race.

3. A shaft assembly according to claim 1, wherein said range is within ±15 degrees from the phase of the ball grooves of said first inner race.

* * * * *

UNITED STATES PATENT AND TRADEMARK OFFICE
CERTIFICATE OF CORRECTION

PATENT NO. : 5,813,917
DATED : SEPTEMBER 29, 1998
INVENTOR(S) : MINORU WAKAMATSU ET AL

It is certified that error appears in the above-identified patent and that said Letters Patent is hereby corrected as shown below:

IN THE CLAIMS

Claim 2, line 2, delete "± 15 degrees and insert --± 30 degrees--.

Signed and Sealed this

First Day of June, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,813,917
DATED : Sep. 29, 1998
INVENTOR(S) : Minoru WAKAMATSU, et al.

It is certified that error appears in the above-identified patent and that said Letters Patent is hereby corrected as shown below:

On the title page, item [73], the Assignee data, is missing. It should read as follows:

--[73] Assignee: Toyota Jidosha Kabushiki Kaisha, Toyota-shi, Japan--

Signed and Sealed this

Thirty-first Day of October, 2000

*Attest:*

Q. TODD DICKINSON

*Attesting Officer*  *Director of Patents and Trademarks*